Sept. 5, 1944.  A. E. HECKMAN  2,357,739
SCREW DIE-HEAD
Filed Nov. 2, 1943  2 Sheets-Sheet 1

INVENTOR
AUGUST E. HECKMAN.
BY
Ely & Pattison
ATTORNEYS

Sept. 5, 1944.  A. E. HECKMAN  2,357,739
SCREW DIE-HEAD
Filed Nov. 2, 1943  2 Sheets-Sheet 2
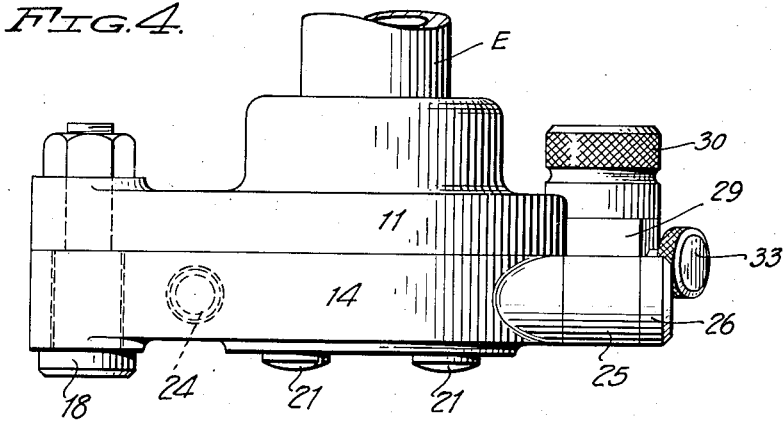
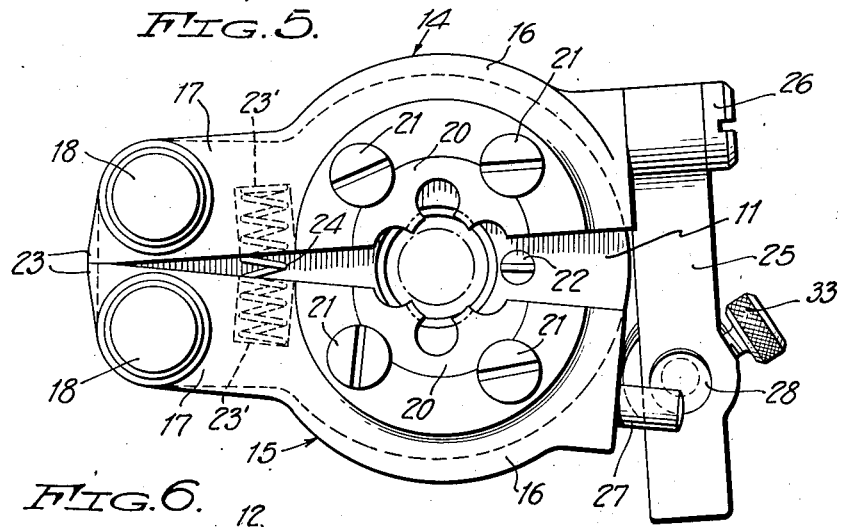
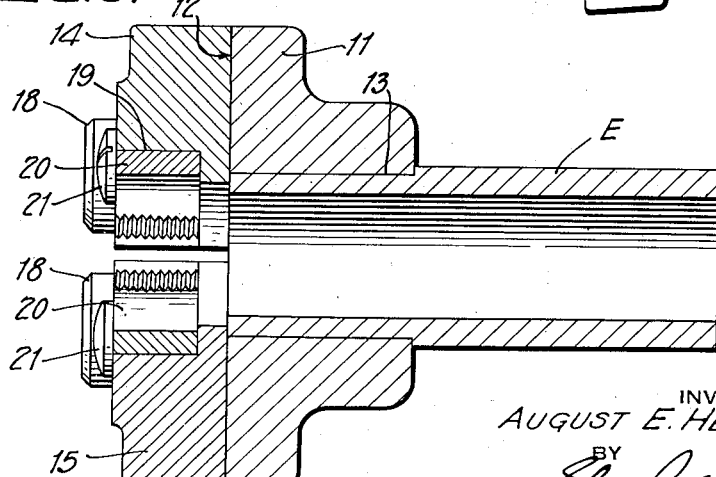
INVENTOR
AUGUST E. HECKMAN.
ATTORNEYS Patented Sept. 5, 1944

2,357,739

UNITED STATES PATENT OFFICE 2,357,739

SCREW DIE HEAD

August E. Heckman, Seaford, N. Y.

Application November 2 1943, Serial No. 508,733

4 Claims. (Cl. 10—116)

This invention relates to improvements in screw cutting dies for use upon lathes, turret lathes or other like machines where a screw threading die is moved into engagement with a piece of work to be externally screw threaded, such as a rod, pipe, or the like.

The primary object of the invention resides in a screw die-head which will automatically release itself from engagement with a piece of work after having cut a predetermined number of threads thereon, thus eliminating the reverse rotation of the die-head effecting a saving of time incident thereto.

Another feature of the invention is to provide a screw die-head which embodies a pair of separable die sections which are normally held closed by a novel latch mechanism which is automatically released by stop means disposed in the path thereof, there being a novel means of adjusting the holding tension of the latch means so that the die-head will remain closed until the last thread of a thread-cutting operation is cut upon a piece of work.

Other novel features of the invention will become apparent as the following specification is read in conjunction with the accompanying drawings, in which, Figure 1 is a side elevational view of the screw die-head in position upon a lathe.

Figure 4 is a top plan view.

Figure 5 is a front elevational view of the screw die-head in open position.

Figure 6 is an enlarged vertical longitudinal sectional view on the line 6—6 of Figure 2.

Figure 2:
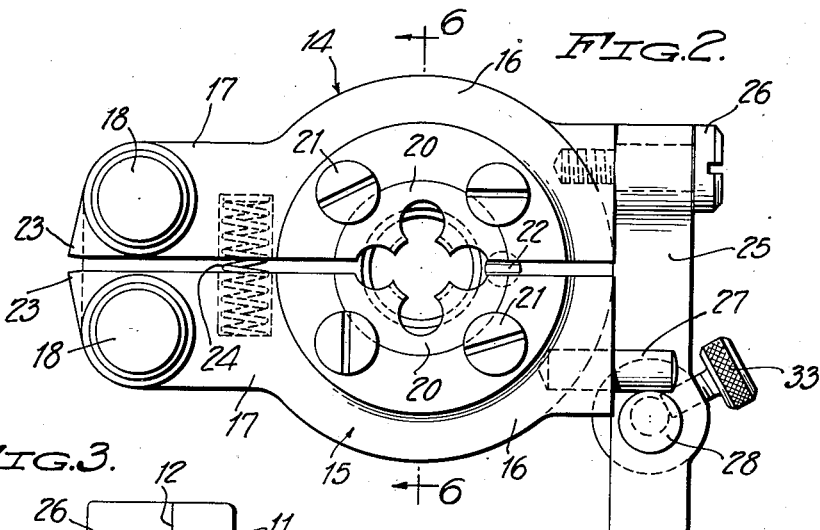
Figure 2 is a front elevational view of the screw die-head per se, the same being shown in closed position.
Figure 3:
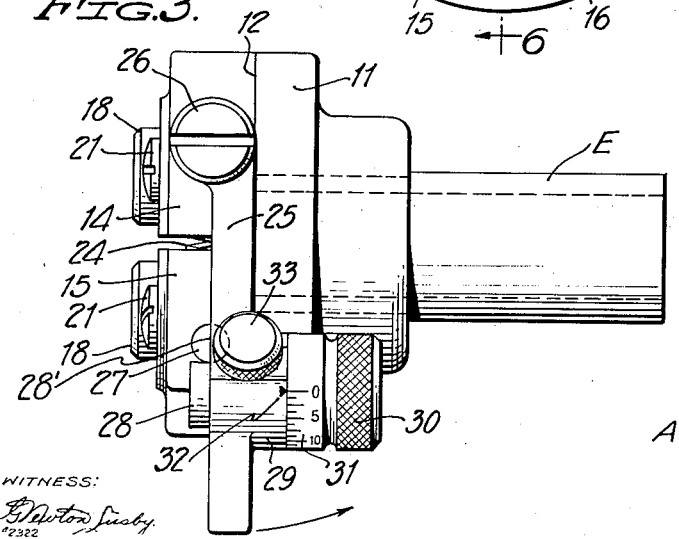
Figure 3 is a side elevational view.

Referring to the drawings by reference characters, the numeral 10 designates my screw die-head in its entirely which includes a body or support 11 having an outer flat face 12 and a bore 13 carried by support 11 and disposed against the flat face 12 thereof are complementary die holder members 14 and 15. Each of the die holder members 14 and 15 comprises a semicircular shaped body portion 16 and a tail portion 17. The tail portions 17 of the respective holder members are pivoted to the flat face 12 of the support by shouldered pivot pins 18 to enable the body portions 16 thereof to be swung toward each other to closed position and away from each other to open position for reasons hereafter explained. The body portions 16 are provided with semicircular shaped seats 19 for the reception of semicircular shaped screw die sections 20 held rigidly within the seats by the heads of clamping screws 21. When the holder members 14 and 15 are closed as shown in Figure 2, the semicircular shaped screw die sections 20, 20 cooperate to provide a screw threading die, the axis of which is concentric to the axis of the bore 13. A centering stop pin 22 carried by the support 11 acts to limit the closing movement of the die holder members 14 and 15. The free ends of the tail portions 17 are provided with stop shoulders 23 which engage each other to limit opening movement of the holder members 14 and 15. The degree of opening movement of the holder members is sufficient to enable the die sections 20, 20 to clear the threads formed upon a piece of work after a thread-cutting operation, such open position being illustrated in Figure 5. The confronting faces of the tail portions 17 are recessed as at 23' to receive the respective ends of a helical expansion spring 24 which normally acts to urge the body portions of die holder members 14 and 15 away from each other to open position.

The die holder members 14 and 15 are held in closed position by a novel releasable latch mechanism now to be described. The latch mechanism includes a trigger arm 25 pivoted at 26 to the free end of the holder member 14. Disposed in the path of swinging movement of the trigger arm 25 and extending beyond the free end of the holder member 15 is a catch pin 27 having a flat contact face 28' formed by milling away a portion thereof. When the holder members 14 and 15 are in closed position as shown in Figure 2, the axes of the pivot 26 and pin 27 are substantially parallel and at right angle to the axis of the bore 19 and axes of the pivot pins 18, 18. Carried by the trigger arm 25 and releasably engageable with the catch pin 27 is an eccentric catch pin 28 rotatably mounted in a bearing 29 formed on the trigger arm 25. A knob 30 is provided on the actuating end of the eccentric pin to facilitate manual turning of the same to a radially adjusted position. The knob 30 is provided with an annular series of calibrations 31 for selective registration with an indicator 32 on the bearing 29. A set screw 33 is threaded in the bearing for locking the eccentric pin in a set adjusted position. The pivoted holder members 14 and 15 are held closed against the action of the spring 24 by friction between the peripheral surface of the eccentric pin 28 and catch pin 27 as best illustrated in Figure 2. The holding action between the catch pin 27 and eccentric pin 28 is determined by the radical adjustment of the eccentric pin, thus the adjustability of the die sections 20—20 may be made and varied from a rough or first cut of thread to a fine or finish cut thread on the piece of work to be threaded.

Figure 1:
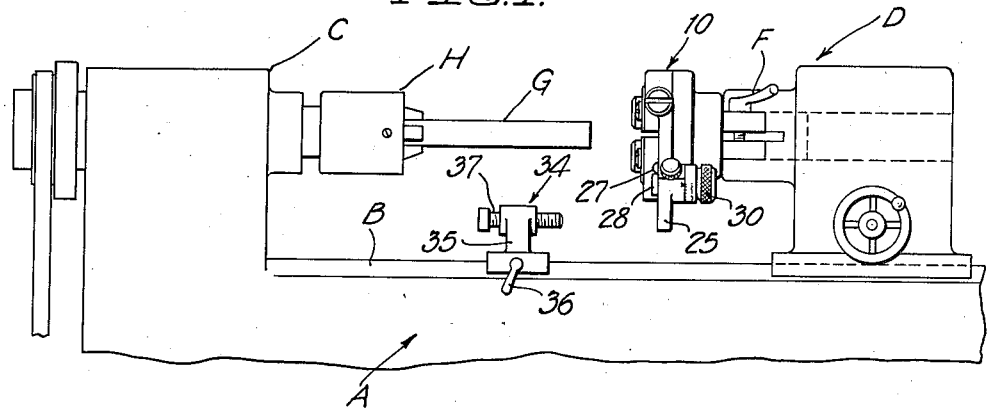

Whereas the die-head 10 may be used on various machines, such as lathe, turret lathe, miller, drilling machine, or the like, I have illustrated in Figure 1, its use upon a conventional lathe A. The lathe A includes a bed B, a fixed head stock C, and a sliding stock D. The die-head 10 has its support or body 11 fixedly secured to one end of a tubular carrier E which fits into the bore 13 thereof. The other end of the carrier is fitted into the stock D and secured thereto by a suitable clamp F. A piece of work G in the form of a pipe, rod, or other round stock to be externally screw-threaded is carried by the chuck H of the head stock C, the axis of said work being concentric to the axis of the tubular carrier E and thread die formed by the die sections 20—20 when the die holder members 14 and 15 are closed. Sliding along the length of the bed B of the lathe is a stop device 34 which includes a body 35 slidably mounted on the bed and secured thereto against sliding movement by a clamp 36. An adjustable stop screw 37 is threaded through the body 35 with its axis parallel to the axis of the head 10, with its free end disposed in the path of the free end of the trigger arm 25. An initial adjustment of the stop device 34 is obtained by releasing the clamp 36 and sliding the device along the bed, after which a final stop adjustment is obtained by manipulation of the screw 37.

With the parts in the position shown in Figure 1, when the die-head 10 is closed, the stock D is slid in the direction of the piece of work G, the latter rotating with the chuck H of the head stock C. As the screw die sections 20, 20 engage the end of the work, external screw threads will be cut thereon. The length of the portion of the work to be threaded is determined by the position of the stop device 34 relative to the work, for when the free end of the trigger arm 25 strikes the confronting end of the screw 37, the trigger arm will be forced to swing in a direction away from the catch pin 27, thus causing the eccentric pin 28 to disengage the catch pin whereupon the spring 24 will effect opening of the holder members 14 and 15 to a position to cause the screw die sections 20, 20 to move free of the cut threads on the piece of work G. The die-head 10 with the stock D may be slid to a return position clear of the threaded end of the piece of work and the die holders manually swung to closed position and held by the latch mechanism preparatory to the next threading operation. It will thereupon be understood that unscrewing of the work from the thread die is eliminated, thus effecting a saving of time and labor in the threading of standard pieces of work.

While I have shown and described what I consider to be the most practical embodiment of my invention, I wish it understood that such changes in construction and design as come within the scope of the appended claims may be resorted to if desired without departing from the spirit of my invention.

Having thus described the invention, what I claim as new and desire to secure by Letters Patent of the United States, is:

1. A screw die-head comprising a support having a flat outer face and an axial bore, a pair of holder members pivoted to the flat face of said support for inward pivotal swinging movement toward each other to closed position and outward pivotal movement away from each other to open position, a pair of complementary die sections carried by the respective holder members which cooperate when the holder members are in closed position to provide a thread-cutting die in axial alinement with said bore, spring means acting to urge the holder members to open position, a trigger arm pivoted to one of said holder members, a catch pin carried by the other of the holder members, and a catch element carried by said trigger arm for releasable engagement with the catch pin when said holder members are in closed position.

2. A screw die-head as set forth in claim 1 in which the catch element comprises an eccentric pin extending from the trigger arm at right angle to the pivotal axis thereof for frictional engagement with the catch pin.

3. A screw die-head as set forth in claim 1 in which the catch element comprises an eccentric pin rotatably mounted on the trigger arm on an axis at right angle to the pivotal axis of said trigger arm for frictional holding engagement with the catch pin, and means for locking the eccentric pin in an adjusted position relative to the degree of frictional engagement thereof with the catch pin.

4. A screw die-head comprising in combination, a support, a pair of holder members pivoted to said support for inward pivotal swinging movement toward each other to closed position and outward pivotal movement away from each other to open position, a pair of complementary die sections carried by the respective holder members which cooperate when the holder members are in closed position to provide a thread-cutting die, spring means acting to urge the holder members to open position, a trigger element pivoted to one of said holder members, a catch pin carried by the other of the holder members, and a catch element carried by said trigger element for releasable engagement with the catch pin when the holder members are in closed position.

AUGUST E. HECKMAN.